United States Patent [19]

Mori

[11] Patent Number: 4,743,082
[45] Date of Patent: May 10, 1988

[54] LIGHT CONDUCTING OPTICAL FIBER BUNDLE

[76] Inventor: Kei Mori, 3-16-3-501, Kaminoge, Setagaya-ku, Tokyo, Japan

[21] Appl. No.: 861,643

[22] Filed: May 2, 1986

Related U.S. Application Data

[63] Continuation of Ser. No. 567,976, Jan. 4, 1984.

[51] Int. Cl.[4] ............................ G02B 6/00; F21V 7/04
[52] U.S. Cl. .............................. 350/96.10; 350/96.24; 350/96.29; 362/32
[58] Field of Search ............... 350/96.10, 96.24, 96.25, 350/96.26, 96.27, 96.28, 96.29; 362/32

[56] References Cited

U.S. PATENT DOCUMENTS

| | | | |
|---|---|---|---|
| 2,825,260 | 3/1958 | O'Brien | 362/32 X |
| 3,225,193 | 12/1965 | Hilton et al. | 350/96.24 |
| 3,455,622 | 7/1969 | Cooper | 362/32 X |
| 3,485,609 | 12/1969 | Peck | 350/96.10 |
| 3,504,060 | 3/1970 | Gardner | 350/96.24 |
| 3,853,658 | 12/1974 | Ney | 350/96.25 X |
| 3,933,455 | 1/1976 | Chown | 350/96.15 |
| 4,227,939 | 10/1980 | Zewail et al. | 136/247 |
| 4,580,195 | 4/1986 | Mori | 362/32 |
| 4,690,500 | 9/1987 | Hayami et al. | 350/96.29 X |
| 4,698,084 | 10/1987 | Severijns et al. | 350/96.24 X |

FOREIGN PATENT DOCUMENTS

| | | | |
|---|---|---|---|
| 57-97502 | 6/1982 | Japan | 350/96.24 |
| 57-179817 | 11/1982 | Japan | 350/96.24 |

*Primary Examiner*—William L. Sikes
*Assistant Examiner*—Brian M. Healy
*Attorney, Agent, or Firm*—Jordan and Hamburg

[57] ABSTRACT

A light conducting member transmits optical energy which is incident on one end thereof. The member is made up of a number of integrated light conducting cables which define the light incidence end of the member at one ends thereof. Each light conducting cable is formed in a truncated hexagonal pyramid or formed to define at least three surfaces thereof. The light incidence end of the light conductor is formed flat or to constitute part of a spherical surface or part of a conical surface.

7 Claims, 4 Drawing Sheets

Fig. 1A  Fig. 2A  Fig. 3A
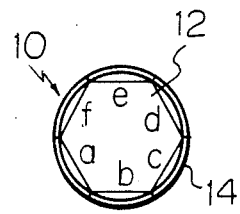 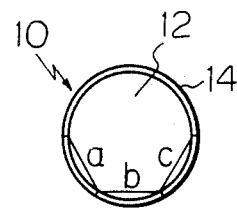 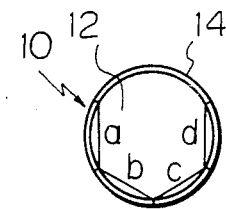
Fig. 1B  Fig. 2B  Fig. 3B
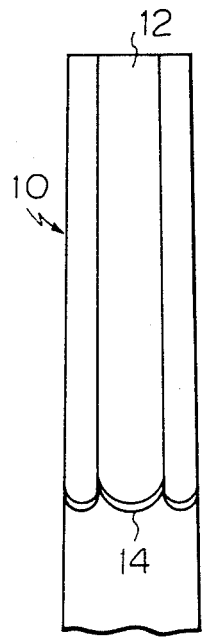 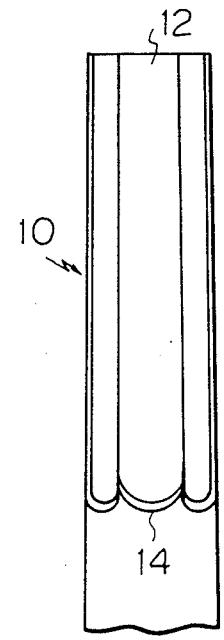 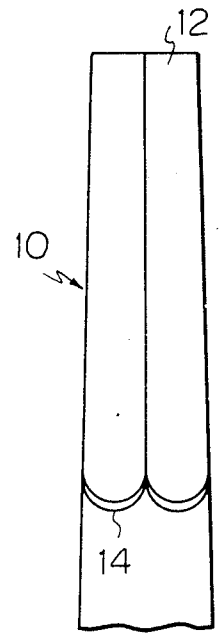

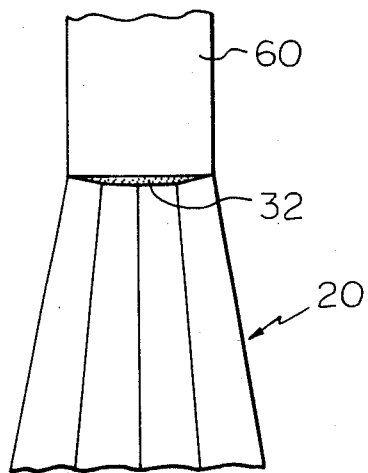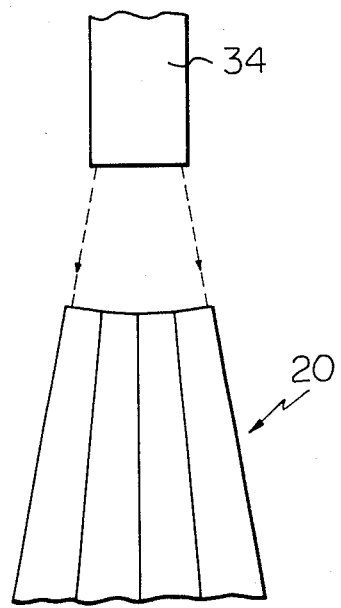

Fig. 8
Fig. 9
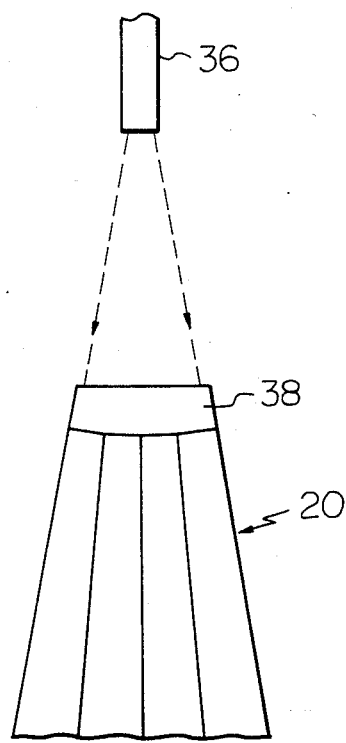
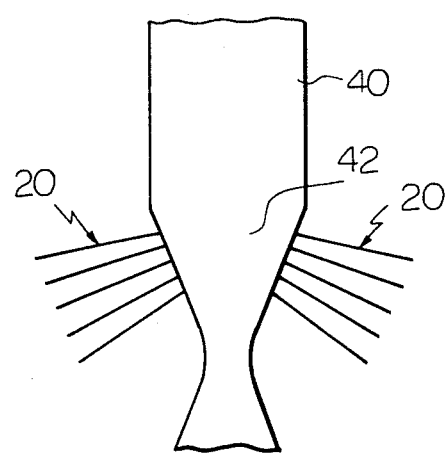

LIGHT CONDUCTING OPTICAL FIBER BUNDLE

This application is a continuation, of application Ser. No. 567,976, filed Jan. 4, 1984.

BACKGROUND OF THE INVENTION

The present invention generally relates to a light conducting member for guiding sunlight or the like incident on one end thereof to a desired location and, more particularly, to a bundle of light conducting cables which constitutes the light conducting member and are integrated at one end thereof to form the light incidence end.

Effective use of solar energy is the key to energy saving today and has been studied in various fields actively. For the most effective use of solar energy for lighting and like applications, solar energy has to be availed as it is without being transformed into thermal energy, electrical energy or like different kind of energy. The applicant has proposed in various forms a system in which a lens or the like converges solar energy into a light conducting cable so that the solar energy may be transmitted therethrough to a desired location. Lighting with the solar energy, compared to the traditional electric lighting, eliminates the fear of leakage when used under water or the fear of spark when used in a gaseous atmosphere and, hence, it is desirable from the safety standpoint.

To guide a sufficient intensity of energy for lighting or the like, a number of light conducting cables may be bundled up to constitute a single light receiving end on which the converged light will become incident. Difficulty has been experienced in effectively introducing light into the light receiving end of the cable assembly in a substantially even intensity distribution.

SUMMARY OF THE INVENTION

It is therefore an object of the present invention to provide a light conducting member which forms an integrated light receiving surface at one end thereof for effectively receiving light supplied thereto.

It is another object of the present invention to provide a light conducting member which allows all the light conducting cables to be supplied with optical energy from a spot light source in a substantially even intensity distribution.

It is another object of the present invention to provide a generally improved light conducting member.

A light conducting member which receives optical energy at one end thereof to allow the optical energy to propagate therethrough to a desired location of the present invention comprises a plurality of light conducting cables one ends of which are integrated to form the one end of the light conducting member, a peripheral portion of each of the light conducting cables adjacent to said one end forming one of a truncated hexagonal pyramid and at least three surfaces of a truncated hexagonal pyramid, the light conducting cables being bonded to each other at respective surfaces of the truncated hexagonal pyramid.

The above and other objects, features and advantages of the present invention will become apparent from the following detailed description taken with the accompanying drawing.

BRIEF DESCRIPTION OF THE DRAWING

FIGS. 1A and 1B are a plan view and a side elevational view respectively, showing an example of a light conducting cable applicable to the present invention;

FIGS. 2A and 2B are views similar to FIGS. 1A and 1B but showing another example of the light conducting cable;

FIGS. 3A and 3B are views also similar to FIGS. 1A and 1B but showing still another example of the light conducting cable;

FIGS. 6–9 are views of exemplary applications of the present invention.

DESCRIPTION OF THE PREFERRED EMBODIMENTS

Figure 4:
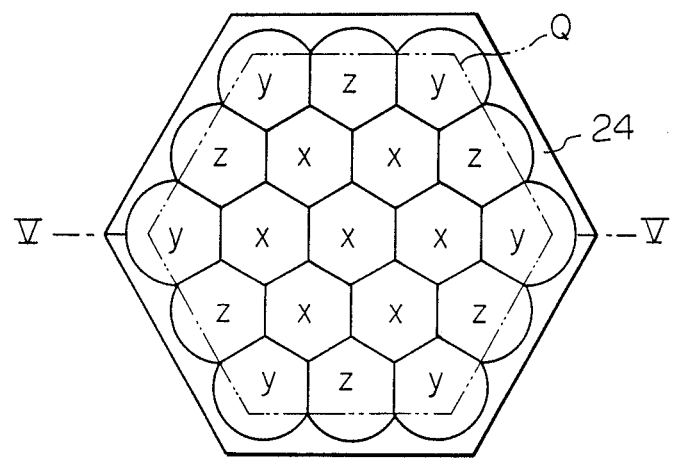
FIG. 4 is a plan view of a light conducting cable assembly embodying the present invention.

While the light conducting member of the present invention is susceptible of numerous physical embodiments, depending upon the environment and requirements of use, substantial numbers of the herein shown and described embodiments have been made, tested and used, and all have performed in an eminently satisfactory manner.

Referring to FIGS. 1A and 1B of the drawing, a light conducting cable 10 is shown which is made up of a core 12 and a cladding 14. An end portion of the cable 10, which is expected to receive light, is cut over a certain length to form a truncated hexagonal pyramid defined by six surfaces a, b, c, d, e and f. Such a cable configuration, as well as those which will follow, is usable for practicing the present invention.

Another cable configuration applicable to the present invention is shown in FIGS. 2A and 2B. The cable end portion in FIGS. 2A and 2B is cut to form three surfaces a, b and c of a truncated hexagonal pyramid. Still another example of the cable configuration is shown in FIGS. 3A and 3B which forms four surfaces a, b, c and d of a truncated hexagonal pyramid. In these drawing, the same reference numerals as those of FIGS. 1A and 1B designate the same structural elements.

Figure 5:
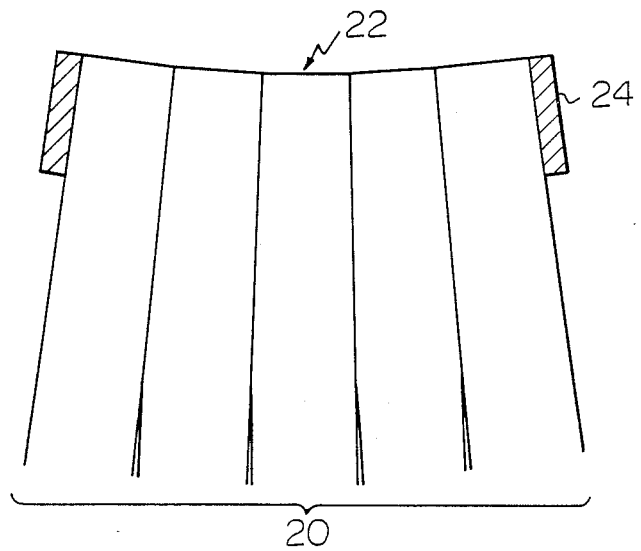
FIG. 5 is a section along line V—V of FIG. 4.

Referring to FIGS. 4 and 5, an assembly of numerous light conducting cables embodying the present invention is shown and generally designated by the reference numeral 20. In this particular embodiment, nineteen light conducting cables are combined by way of example. As shown, the cable assembly, or light conducting member, 20 has an integrated light receiving surface 22 which is defined by a number of the cables shown in FIGS. 1A and 1B to 3A and 3B. The surfaces of the cables 10 defining a truncated hexagonal pyramid or part thereof are bonded to each other to complete the light receiving surface 22, which in this case is part of a spherical surface.

In FIG. 4, which is a plan view of the cable assembly 10, the cables 10 having the configuration shown in FIGS. 1A and 1B are designated by x, those with the configuration of FIGS. 2A and 2B by y, and those with the configuration of FIGS. 3A and 3B by z. It should be noted, however, that the configuration shown in FIG. 4 is only illustrative and all the cables 10 may be shaped as shown in FIG. 1, for example.

The cable assembly shown in FIGS. 4 and 5 is firmly held by a retainer or frame 24. The inner periphery of the frame 24 is so shaped as to be complementary to the outer periphery of the aggregation of the cables 10, thereby surely and stably holding the cables 10. The outer periphery of the frame 24 is shaped in an equilateral hexagon. The cable assembly 20 retained by the frame 24 may be combined with a desired number of other such assemblies (e.g. seven, nineteen, thirty-seven or sixty-one) in order to define a wider light receiving area.

Referring to FIGS. 6-9. there are shown some exemplary arrangements for supplying optical energy from another light conducting element to the cable assembly 20 through the unique light receiving surface. Description will be made taking the embodiment of Fig. 4 for example.

In FIG. 6, a light conducting rod 30 is bonded to the light receiving surface 22 of the cable assembly 20 by means of optical starch 32 or the like. The crosssectional area of the rod 30 is substantially the same as the light receiving surface 22 of the cable assembly.

In FIG. 7, a light conducting rod 34 has a diameter which is smaller than that of the light receiving end 22 of the cable assembly 20, while an air gap is defined between the rod 34 and the light receiving surface 22.

In FIG. 8, a light conducting rod 36 has a diameter smaller than that of the rod 34 of FIG. 7 and the air gap between the rod 36 and the light receiving surface 22 is larger than that of FIG. 7. An auxiliary optical member 38 is located ahead the light receiving surface 22 in FIG. 8; the optical member 38 may be bonded to the surface 22 by means of optical starch.

Further, in FIG. 9, a plurality of cable assemblies 20 are combined with a light conducting rod 40 which includes a conical section 42. In the arrangement of FIG. 9, the light receiving end of each cable assembly 20 is so shaped as to form part of a conical surface complimentary to the conical section 42. The conical cable surfaces 22 in FIG. 9 are individually bonded to the conical section 42 of the rod 40 so that optical energy propagating through the rod 40 may be distributed into the cable assemblies 20. Concerning a system for distributing part of optical energy from a first light conductor to a second light conductor through a conical portion of the first, reference may be made to Japanese Patent Application No. 57-99776/1982.

In the application shown in FIG. 8, optical energy radiated from the rod 36 (in practice, sunlight having a high energy density converged by a lens (not shown)) is introduced into the cables in the assembly 20 through the light receiving surface 22 in accordance with the present invention. However, the optical energy output from the rod 36 is only illustrative and it may be provided by converging light issuing from a artificial light source, e.g. xenon lamp. In such a case, the auxiliary optical member 38 is not always essential inasmuch as the received energy density is relatively low.

Where the light receiving surface 22 of each cable assembly 20 is kept in contact with the conical surface of the rod 40 as shown in FIG. 9, the surface 22 has to be machined into a conical surface. This can be readily implemented by the surface 22 which is shaped as part of a spherical surface.

It may be desired to finish the light receiving surface 22 to a spherical mirror surface in the examples shown in FIGS. 6 to 8 as well as other examples not shown. Again, such a configuration is readily attainable due to the unique shape of the surface 22.

In FIG. 6, the end of the rod 30 is bonded by the optical starch 32 to the light receiving surface 22 which forms part of a spherical surface. In this kind of application, the surface 22 may be ground to be a flat surface instead of the illustrated spherical surface. Then, it is preferable to shape and dimension the light output end of the rod 30 as indicated by a dash-and-dots line Q in FIG. 4.

In summary, it will be seen that the present invention provides a light conducting cable assembly which supplies light to all the light conducting cables included therein in a substantially even intensity distribution, because light receiving end portions of the cables are integrated to form part of a spherical surface at an end of the assembly. The integration of individually ground cables to form the light receiving surface eliminates the need for machining the light receiving surface after the integration. Further, the light receiving surface can be readily finished to a mirror surface to form part of a spherical surface or that of a conical surface, due to the unique configuration thereof.

Various modifications will become possible for those skilled in the art after receiving the teachings of the present disclosure without departing from the scope thereof.

What is claimed is:

1. The combination comprising a plurality of elongate light conducting cables arranged to form an elongate light conducting member, said light conducting cables each comprising a core and cladding disposed about said core, said cladding having an outer circular configuration, said light conducting member having a light receiving end face which receives optical energy to allow the optical energy to propagate from said light receiving end face to a selected location, each of said cables having a light receiving end section, said light receiving end face of said member being formed by said light receiving end sections of said plurality of cables, said light conducting cables comprising a first, second and third group of light conducting cables, a longitudinal end portion of each of said first group of light conducting cables adjacent to said light receiving end face having six surfaces of a truncated hexagonal pyramid, a longitudinal end portion of each of said second group of light conducting cables adjacent to said light receiving end face having four surfaces of a truncated hexagonal pyramid, said longitudinal end portion of each of said second group of light conducting cables having an outer surface defined by a first portion of said cladding of circular configuration and said four surfaces of a truncated hexagonal pyramid, a longitudinal end portion of each of said third group of light conducting cables adjacent to said light receiving end face having three surfaces of a truncated hexagonal pyramid, said longitudinal end portion of each of said third group of light conducting cables having an outer surface defined by a second portion of said cladding of circular configuration and said three surfaces of a truncated hexagonal pyramid, and bonding means bonding said light conducting cables at at least portions of said surfaces of each of said truncated hexagonal pyramids to thereby stably hold said light conducting cables together at said surfaces adjacent said light receiving end face to form a generally truncated hexagonal pyramid in which the plurality of end sections of said cables form an integrated light receiving end face which defines the smaller end of said generally truncated hexagonal pyramid, said first and second cladding portions of circular configuration defining the outer peripheral surface of said generally truncated hexagonal pyramid and extending from said integrated light receiving end face.

2. The combination according to claim 1, wherein said light receiving end face is formed as a flat surface.

3. The combination according to claim 1, wherein said light receiving end face has a partial spherical surface.

4. The combination according to claim 1, wherein said light receiving end face has a partial conical surface.

5. The combination comprising a plurality of elongate light conducting cables each of circular cross-section arranged to form an elongate light conducting member, said light conducting cables each comprising a core material and a cladding material disposed about said core material, said light conducting member having a light receiving end face which receives optical energy to allow the optical energy to propagate from said light receiving end face to a selected location, each of said cables having a light receiving end section, said light receiving end face of said member being formed by said light receiving end sections of said plurality of cables, said light conducting cables comprising a first, second and third group of light conducting cables, a longitudinal end portion of each of said first group of light conducting cables adjacent to said light receiving end face having six surfaces of a truncated hexagonal pyramid, a longitudinal end portion of each of said second group of light conducting cables adjacent to said light receiving end face having four surfaces of a truncated hexagonal pyramid, a longitudinal end portion of each of said third group of light conducting cables adjacent to said light receiving end face having three surfaces of a truncated hexagonal pyramid, said six surfaces, said four surfaces, and said three surfaces of said first, second and third group of light conducting cables respectively being defined by said core material, the longitudinal end portion of said second and third group of conducting cables having their respective outer surfaces defined partially by said cladding material, and bonding means bonding said light conducting cables at at least portions of said surfaces of each of said truncated hexagonal pyramids to thereby stably hold said light conducting cables together at said surfaces adjacent said light receiving end face to form a generally truncated hexagonal pyramid in which the plurality of end sections of said cables form an integrated light receiving end face which defines the smaller end of said generally truncated hexagonal pyramid.

6. The combination comprising a plurality of elongate light conducting cables each having a core and a cladding and each being of circular cross-section arranged to form an elongate light conducting member, said light conducting member having a light receiving end face which receives optical energy to allow the optical energy to propagate from said light receiving end face to a selected location, each of said cables having a light receiving end section, said light receiving end face of said member being formed by said light receiving end sections of said plurality of cables, said light conducting cables comprising a first, second and third group of light conducting cables, a longitudinal end portion of each of said first group of light conducting cables adjacent to said light receiving end face having six surfaces of a truncated hexagonal pyramid, a longitudinal end portion of each of said second group of light conducting cables adjacent to said light receiving end face having four surfaces of a truncated hexagonal pyramid, a longitudinal end portion of each of said third group of light conducting cables adjacent to said light receiving end face having three surfaces of a truncated hexagonal pyramid, the outer circumference of said first group of light conducting cables being formed by a plurality of cores and the outer circumference of said second and third groups being formed by a plurality of claddings, bonding means bonding said light conducting cables at at least portions of said surfaces of each of said truncated hexagonal pyramids to thereby stably hold said light conducting cables together at said surfaces adjacent said light receiving end face to form a generally truncated hexagonal pyramid in which the plurality of end sections of said cables form an integrated light receiving end face which defines the smaller end of said generally truncated hexagonal pyramid, and a hexagonal frame about said cables at said bonding means for holding at least a portion of said plurality of bonded cables, the inner periphery of said frame being formed complementary to the outer periphery of said bonded cables.

7. The combination comprising a plurality of elongate light conducting cables having a core and a cladding and each being each of circular cross-section arranged to form an elongate light conducting member, said light conducting member having a light receiving end face which receives optical energy to allow the optical energy to propagate from said light receiving end face to a selected location, each of said cables having a light receiving end section, said light receiving end face of said member being formed by said light receiving end sections of said plurality of cables, said light conducting cables comprising a first, second and third group of light conducting cables, a longitudinal end portion of each of said first group of light conducting cables adjacent to said light receiving end face having six surfaces of a truncated hexagonal pyramid, a longitudinal end portion of each of said second group of light conducting cables adjacent to said light receiving end face having four surfaces of a truncated hexagonal pyramid, a longitudinal end portion of each of said third group of light conducting cables adjacent to said light receiving end face having three surfaces of a truncated hexagonal pyramid, some of said cables being centrally disposed in a central area and other of said cables being disposed in a peripheral area such that said central area is surrounded by said peripheral area, the circumference of said central area being formed by the cores of said first group of cables, the circumference of said peripheral area being formed by the claddings of said second and third groups of cables, and bonding means bonding said light conducting cables at at least portions of said surfaces of each of said truncated hexagonal pyramids to thereby stably hold said light conducting cables together at said surfaces adjacent said light receiving end face to form a generally truncated hexagonal pyramid in which the plurality of end sections of said cables form an integrated light receiving end face which defines the smaller end of said generally truncated hexagonal pyramid.

* * * * *